United States Patent [19]
Poettmann

[11] 3,892,252
[45] July 1, 1975

[54] MICELLAR SYSTEMS AID IN PIPELINING VISCOUS FLUIDS

[75] Inventor: Fred H. Poettmann, Findlay, Ohio

[73] Assignee: Marathon Oil Company, Findlay, Ohio

[22] Filed: Dec. 18, 1972

[21] Appl. No.: 316,188

[52] U.S. Cl. .................. 137/13; 138/145; 137/604
[51] Int. Cl. ............................................. F17d 1/16
[58] Field of Search ............. 137/13, 604; 166/308; 138/145, 146

[56] References Cited
UNITED STATES PATENTS

| | | |
|---|---|---|
| 3,216,435 | 11/1965 | Poettmann ........................ 137/13 |
| 3,307,567 | 3/1967 | Gogarty ........................... 137/13 |
| 3,451,480 | 6/1969 | Zeh ............................... 137/13 X |
| 3,500,932 | 3/1970 | Webb .............................. 166/308 |

*Primary Examiner*—Alan Cohan
*Attorney, Agent, or Firm*—Joseph C. Herring; Richard C. Willson, Jr.; J. L. Hummel

[57] ABSTRACT

In pipelining viscous fluids, e.g., heavy oils, an annular ring of micellar solution is applied to the inside surface of the pipe to decrease the energy necessary to pump the viscous liquid and to increase the carrying capacity of the pipeline. The micellar solution may be either water or oil-external.

7 Claims, 4 Drawing Figures

MICELLAR SYSTEMS AID IN PIPELINING VISCOUS FLUIDS

BACKGROUND OF THE INVENTION

1. Field of the Invention

The present invention relates to the field of transporting viscous fluids generally classified in U.S. Patent Office Class 117, subclass 97, and in Pipelines for such purposes, generally classified in Class 138, subclass 145.

2. Description of the Prior Art

U.S. Pats. Nos. 3,280,848 and 3,220,874 to the present inventor, teach the the formation of polymer films on the interior surfaces of pipelines to reduce drag in the pumping of fluids and diffusion techniques for forming such films, have been studied at six Journal Hydronautics 27–33 (January, 1972) and at 26 Chemical Engineering Science 1065–1073 (Great Britain, 1971). Specialized techniques for forming layers on the interior of pipeline surfaces have also been taught in U.S. Pats. Nos. 3,307,567, 3,216,435, 3,447,507 and 3,473,572 by the present inventor.

However, the polymers employed in such drag reduction techniques are relatively expensive and relatively permanent. The present invention permits the use of relatively inexpensive micellar systems to reduce drag. For forming more temporary films over the interiors of pipelines, the micellar systems can either be maintained on the pipeline wall by repeated injections or they can be permitted to discontinue gradually being absorbed into the liquids being transported. This is particularly useful in commercial pipelines where highly viscous fluids which require such drag reducing films may be followed by highly fluid liquids which do not require such films and which may even tend to destroy gel films.

SUMMARY OF THE INVENTION

General Statement of the Invention

According to the present invention, micellar systems, e.g., those containing surfactant, hydrocarbon, and water particularly those "micellar dispersions" and "micellar solutions" produced according to U.S. Pats. Nos. 3,467,188, 3,467,187 and 3,476,184, are diffused at the interface between the interior surface of the pipeline and the fluids being transported so as to form a thin film. Interface between the micellar system and the fluids being transported because the velocity gradient can extend through the film, the film is substantially more smooth and/presents substantially less drag than did the interior surface of the pipeline and flow is accordingly increased while pumping power requirements are decreased.

Utility of the Invention

The invention is applicable to a wide variety of fluids including viscous fluids such as heavy crude oils, waxy crudes, refined lubricating oils, fuel oils, polymer solutions, and similar high viscosity homogeneous liquids.

The invention is also useful for the transporting of slurries, e.g., coal-water slurries, cement, sand and gravel slurries.

DESCRIPTION OF THE PREFERRED EMBODIMENTS

Figure 1:
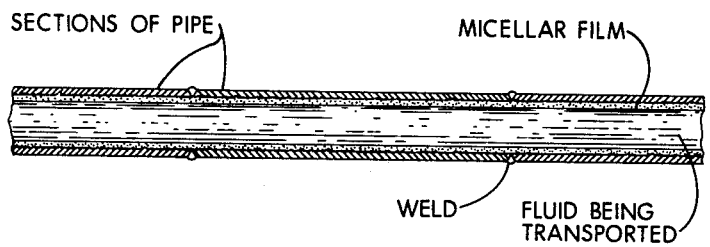
FIG. 1 is a schematic representation of a series of pipe sections welded together with the micellar system film of the present invention deposited on the interior of a substantially continuous film.

Pipeline: The invention is applicable to a wide variety of pipelines, but will find particular usefulness with large diameter, long-distance pipelines in which pumping costs and capital investment per gallon per minute of flow capacity become very substantial. While the invention can be utilized with continuous extruded pipe, e.g., polyvinyl chloride pipe, it will most commonly be utilized with sections of steel or other metallic pipe which have been welded, braised, screwed, flanged, or otherwise joined together to form a continuous conduit.

Transport Fluids: As mentioned above under "Utility" a wide variety of fluids being transported can benefit from the use of the invention. Particularly preferred of all such fluid for reasons of economy and the volumes which are commercially transported, are viscous crude oils.

Micellar Systems: Micellar systems for use with the present invention will generally comprise surfactant, water, and hydrocarbon and can be formulated and prepared according to a variety of known techniques, e.g., those of the U.S. Patents mentioned above.

Because older pipelines which have been exposed to crude oils are generally oil-wet, oil-external micellar solutions will tenaciously stick to the surface of the pipeline so that they themselves present a smooth surface to the fluid being transported. Oil-external micellar solutions will also generally clean the inside of the pipe of any debris or oily or asphaltic materials sticking to its surface. Such oil-external micellar solutions are well known for their ability to spread over a surface and to solubilize tarry or heavy oil materials. This affinity to stick to the surface provides a film having longer life, and the corresponding number of stations necessary to replenish the film will be fewer, i.e., the distance between stations can be longer. The film will also solubilize some of the heavy crude so that there will not be a finite phase boundary between the film and the crude as in the case of, e.g., water and crude oil. The absence of a finite phase boundary further reduces the drag and increases the carrying capacity of the pipeline.

Water-external micellar solutions can also be used for the purposes of the invention though they are less preferred. They will generally be more effective than a film of pure water but in most cases will not be as effective as oil-external micellar systems.

Water-external systems will also clean the inside of the pipe and will make the inside surface strongly water-wet. However, there will be a phase boundary between the water-external micellar system and a viscous oil being transported. On the other hand, where the transport fluid is water-based, e.g., in an aqueous solution of polymers or an aqueous slurry, the use of the water-external system will generally provide the preferred absence of phase boundary and the corresponding reduction in drag. Some particular micellar solutions for use with the present invention are listed in Table 1:

TABLE I

MICELLAR SOLUTION COMPOSITIONS

| Component | | System "A" (oleophilic) % | System "B" (hydrophilic) % | System "C" (hydrophilic) % |
|---|---|---|---|---|
| Hydrocarbon | Crude Column Overhead | 68.06 | 56.11 | |
| | Henry Crude | | | 27.4 |
| Aqueous Diluent | Henry Plant Water | 17.54 | | |
| | Palestine Water | | | 64.6 |
| | Distilled Water | | 32.01 | |
| Surfactant | Ammonium Alkyl aryl Naphthenic Sulfonate | 12.72* | 10.45* | 6.7* |
| | Alconox** | | 502 mg/100 cc water | |
| Semi-polar Compound | Isopropyl Alcohol | 1.41 | 1.43 | 0.74 |
| | Nonyl Phenol | 0.27 | | 0.56 |
| Electrolyte | Sodium Hydroxide | | 417 mg/100 cc water | 979 mg/100 cc water |

*Based on 80% active sulfonate, 20% vehicle oil; on a solvent-free basis, molecular weight about 440.
**A trademark of E. G. Sargent & Co., New York, New York, 10003; identified as a hydrophilic alklyl aryl sodium sulfonate of about 10% activity.

Batch or continuous: The invention may be practiced with either intermittent or continuous flows of the micellar fluids onto the interior surface of the pipeline.

EXAMPLE I

Figure 3:
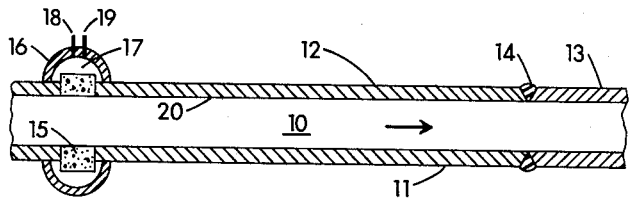
FIG. 3 shows one technique for applying the film utilizing stationary injection points based along a pipeline.

Referring to FIG. 3, a heavy viscous crude 10 is being transported through a pipeline 11 made up of sections of pipe 12 and 13 joined together by welds 14. A porous annular ring 15 is inserted into the pipe so that the interior surface of the annular ring is substantially flush with the interior surface of the pipeline 11. This porous annular ring is surrounded by a reservoir 16 which encircles the pipe and provides a supply of micellar system 17 of the type shown in System A of Table 1. Additional quantities of micellar solution 18 enter reservoir 16 through inlet 19.

Figure 2:
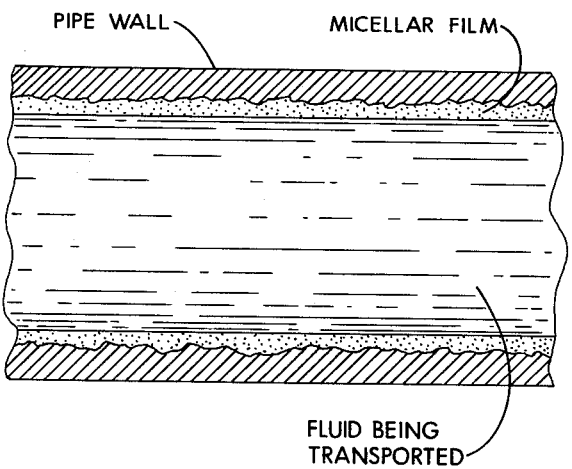
FIG. 2 shows the relative smoothness of the interface between the micellar system-transport fluid as compared to the roughness of the pipe wall.

When the flow of micellar system 17 is commenced through the porous annular ring 15 by pressurizing reservoir 16 through the action of a pump (not shown) micellar system is exuded through the porous annular ring 15 forming a thin film 20 which is spread around the interior surface of the pipeline 11 and spread some distance down the pipeline through the action of the crude oil 10 being transported. The effect of this micellar film is to form a continuous layer such as that shown in FIGS. 1 and 2 of the present specification. This layer of micellar system eliminates any phase boundary between the flowing viscous crude 10 and the micellar system and in addition, substantially eliminates the effect of the roughness of the interior surface of the pipe as shown in FIG. 2. The result is a reduction in the amount of tar required to pump a gallon of the viscous crude 10 a given distance and also an increase in the number of gallons of viscous crude which can be pumped through the pipeline 11 each day.

EXAMPLE II

Figure 4:
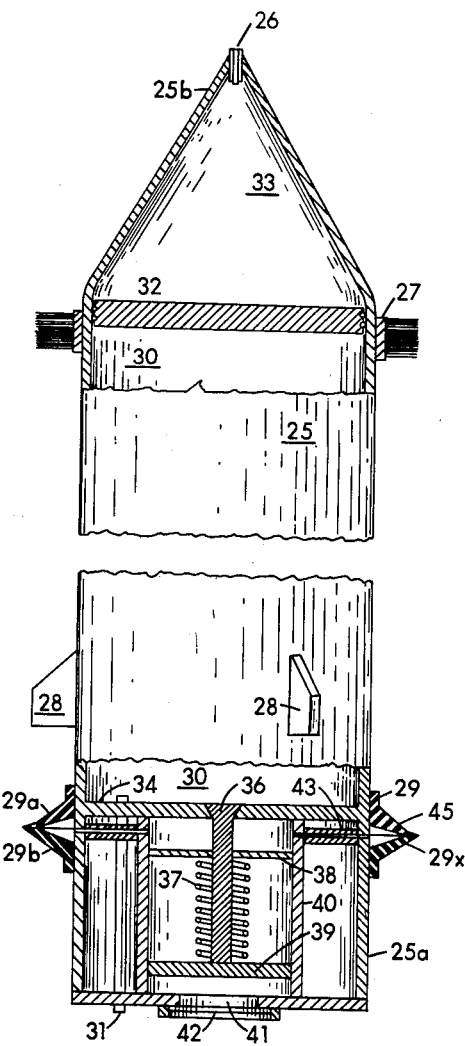
FIG. 4 is a schematic representation of an alternate method of depositing the film utilizing a moving pig which exudes micellar system onto the pipe wall as the pig moves through the pipeline by action of the fluid being transported.

Referring to FIG. 4, a pipeline pig of the general variety taught in U.S. Pat. No. 3,447,507 exudes a thin film of micellar system onto the interior of a pipeline causing the effect shown in FIGS. 1 and 2. The pipeline pig carried down stream by the action of the transport fluid. The hollow pig 25 shown in FIG. 4 comprises a cylindrical rearward body portion 25a and a frusto-conical forward portion 25b having a valve-controlled inlet passage 26. An annular brush-like scouring member 27 is mounted at the front of cylindrical portion 25a, a plurality of spacer members 28 are mounted in circumferentially spaced arrangement on an intermediate portion and an annular discharge member 29 is mounted near the rear of portion 25a and is formed of flexable materials such as rubber. The cylindrical portion 25a is of substantially less diameter than the inside diameter of the line in which it is introduced while the scouring member 27 is of slightly larger diameter and flexable member 29 is slightly larger. The spacers 28 provide a slight clearence and are essentially rigid so as to prevent an appreciable pelting of the pig in its movement through the line. This interior cylindrical portion 25a is partitioned to define a fluid storage compartment 30 which is filled with the micellar system introduced through a valve inlet 31. As compartment 30 fills it forces a piston 32 forward until its motion is arrested by the tapering surface of portion 25b, sealing forward compartment 33 into which compressed air is charged through the valve inlet 26. A partition 34 forming the rear enclosure or bulkhead of chamber 30 has a tapered opening 35 acting as seat of the clinical head of a valve 36. A coil spring 37 on the stem of valve 36 is held between a fixed partition 38 and a piston or traveling head 39 secured at the end of the stem of valve 36 so as to provide limited movement of the piston within a cylindrical housing 40 under the force of the fluid moving through the line. An opening 41 near the rear end of body 25 is normally sealed by a diaphram 42 and emits a flow of fluid into contact with piston 39 when it is punctured by an actuating means (not shown) applied when the piston is to begin its spread of micellar system.

Modifications of the Invention

It should be understood that the invention is capable of a variety of modifications and variations which will be made apparent to those skilled in the art by a reading of the specification and which are to be included within the spirit of the claims appended hereto.

What is claimed is:

1. A method for increasing flow capacity of pipelines for transport of fluids, said method comprising introducing a micellar system into the fluid flow of such a pipeline at a point near the periphery of said pipeline to form a self-sustaining, substantially continuous, adhering film, said micellar system comprising surfactant, hydrocarbon, and water.

2. A pipeline having increased flow capacity for transport of fluid, comprising a plurality of sections of pipe joined as a continuous conduit and a substantially continuous lining on the external surface of said pipeline, said lining comprising a self-sustaining substantially continuous adhering film of a micellar system, said micellar system comprising surfactant, hydrocarbon, and water, the interior interface of said micellar system with the fluids being transported in said pipeline being considerably smoother than the internal surface of said sections of pipe.

3. A method according claim 1 wherein said micellar system is injected at a plurality of points near the interior of said pipeline and is moved downstream by the action of fluids flowing through said pipeline, said micellar system forming said interior lining by the conjoint action of said fluids moving through said pipeline and an attraction between said micellar system and the interior wall of said pipeline.

4. A process according to claim 1 wherein said micellar system is a water-external micellar system.

5. A process according to claim 2 wherein said micellar system is a oil-external micellar system.

6. A method according to claim 1 wherein the fluids transported in said pipeline are viscous fluids selected from the group consisting of heavy crude oils, waxy crudes, refined lubricating oils, fuel oils and polymer solutions.

7. A method according to claim 1 wherein the fluids transported are slurries.

* * * * *

UNITED STATES PATENT OFFICE
CERTIFICATE OF CORRECTION

Patent No. 3,892,252   Dated July 1, 1975

Inventor(s) Fred H. Poettmann

It is certified that error appears in the above-identified patent and that said Letters Patent are hereby corrected as shown below:

Column 1, starting at line 51: beginning at "Interface . . ." the last sentence of the paragraph should read as follows: --Interface between the micellar system and the fluids being transported [because the velocity gradient can extend through the film, the film] is substantially more smooth and <u>because the velocity gradient can extend through the film, the film</u> presents substantially less drag than did the . . . . . --

| | |
|---|---|
| Column 4, line 1: | after "pig" add --is-- |
| Column 4, Table I; | in second footnote, "**", delete "alklyl" and substitute therefor --alkyl-- |
| Column 4, line 30: | delete "flexable" and substitute therefor --flexible-- |
| Column 4, line 34: | delete "flexable" and substitute therefor --flexible-- |
| Column 4, line 35: | delete "clearence" and substitute therefor --clearance-- |
| Column 4, line 53: | delete "diaphram" and substitute therefor --diaphragm-- |
| Column 6, line 9: | delete "a" and substitute therefor --an-- |

Signed and Sealed this

Twelfth Day of June 1979

[SEAL]

Attest:

RUTH C. MASON
Attesting Officer

DONALD W. BANNER
Commissioner of Patents and Trademarks